(12) United States Patent
Shinozaki et al.

(10) Patent No.: US 7,916,279 B2
(45) Date of Patent: Mar. 29, 2011

(54) MEASURING SYSTEM

(75) Inventors: Hajime Shinozaki, Tokyo (JP); Kaoru Kumagai, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 200 days.

(21) Appl. No.: 12/408,222

(22) Filed: Mar. 20, 2009

(65) Prior Publication Data

US 2009/0237639 A1    Sep. 24, 2009

(30) Foreign Application Priority Data

Mar. 21, 2008    (JP) ................................. 2008-074423

(51) Int. Cl.
*G01C 3/08* (2006.01)
(52) U.S. Cl. ..................................................... 356/4.01
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

2005/0254044 A1*  11/2005  Sugiura et al. ............. 356/141.1
2006/0176473 A1*  8/2006  Yasutomi et al. .......... 356/141.3

FOREIGN PATENT DOCUMENTS

JP    10-232130 A    9/1998
JP    11-83484 A    3/1999

* cited by examiner

*Primary Examiner* — Thomas H Tarcza
*Assistant Examiner* — Luke D Ratcliffe
(74) *Attorney, Agent, or Firm* — Brinks Hofer Gilson & Lione

(57) ABSTRACT

A measuring system includes a measuring apparatus provided at an already-known point, a plurality of light-receiving apparatuses provided at measured points, and a main calculating apparatus for instructing to the measuring apparatus and to the light-receiving apparatus, the measuring apparatuses including a wireless communication section for communicating a measurement data with the light-receiving apparatus or with the main calculating apparatus, wherein the measurement data includes an angle detected by the emission-direction detecting section and a distance measured by the distance-measuring section, the light-receiving apparatus including a light-receiving side wireless communication section communicating the measurement data of the measured point with the measuring apparatus or with the main calculating section, the main calculating sections including a main memory collecting and storing the measurement data which is measured by the measuring apparatus and by the plurality of light-receiving apparatuses.

6 Claims, 13 Drawing Sheets

MEASURING SYSTEM

RELATED APPLICATIONS

This application claims priority under 35 U.S.C. §119 to Japanese Patent Application No. JP2008-074423 filed on Mar. 21, 2008, the entire content of which is hereby incorporated by reference.

BACKGROUND OF THE INVENTION

1. Field of the Invention

The present invention relates to a measuring system that measures positional information of a plurality of measured points at the same time, and in particular, relates to a measuring system that improves work efficiency.

2. Description of Related Art

In measurements in civil engineering works, for example, roadwork, etc., positions at both sides of the road, vertical intervals, and the width of the road are measured. Such measurement work is a collaborative activity by two or more measurement workers.

In the past, when the measurement was carried out by a total station, piles were driven in predetermined intervals, for example, in the intervals of 10 m or 20 m, along both sides of the road. In the piling points, measurement assistants support the measured objects (for example, a pole having a prism). The measurement engineer carries out the measurement of the measured objects from the total station side, and collects the measurement data of each piling point.

In the above-mentioned measurement method using the total station, the measurement engineer has to instruct the measurement assistants in the measurement. When there are plural measurement assistants, the work performance is especially inferior. In addition, the measurement assistants have to have predetermined measurement knowledge and be able to used predetermined measurement techniques. Therefore, the measurement costs are high.

In a small-scale measurement site, it is difficult to gather the measurement assistants having the measurement knowledge and the measurement technique. The measurement engineer has to carry out the measurement engineer's work, the site construction engineer's work, and the field overseer's work alone and concurrently. Therefore, the measurement work is complex and inefficient. As a technique for solving such problems, a measuring apparatus, which can readily guide the measurement assistant having the measured object to the measured point, has been disclosed (for example, as in Japanese Unexamined Patent Application Publication No. 11-83484).

Moreover, when there are plural measurement assistants, the measured points measured at the same time are plural. Therefore, these data have to be managed efficiently. As a management technique of measured points, a measured-point-managing apparatus, which can have a distribution of measured points understood and evaluated quantitatively and intuitively, has been disclosed (for example, as in Japanese Unexamined Patent Application Publication No. 10-232130).

SUMMARY OF THE INVENTION

When the positional information of plural measured points is measured at the same time by two or more people, the measurement data measured respectively by the measurement engineer and the measurement assistants is manually synthesized at the office after the measurement. Then, the measurement result is confirmed. When the measurement is carried out, there may be errors such as an overlap of the name of measured points, errors in measurements, and missing necessary measurement data. Therefore, the synthetic work is conducted taking into account the input of all measurement workers.

Furthermore, the measurement result cannot be understood until the synthetic work is completed. Therefore, remeasurements at the measurement site are later required, depending on the measurement results. Therefore, as a measuring system that measures positional information of a plurality of measured points at the same time by two or more people, work efficiency is inferior.

In consideration of these circumstances, an object of the present invention is to provide a technique that improves work efficiency in a measuring system that measures positional information of a plurality of measured points at the same time.

The present invention is a measuring system comprising: a measuring apparatus provided at an already-known point; a plurality of light-receiving apparatuses provided at measured points; and a main calculating apparatus for instructing the measuring apparatus and the light-receiving apparatus; the measuring apparatus comprising: a laser-beam-emitting section that rotates and emits both a standard-face-forming laser beam composed of two or more fan-shaped laser beams, of which at least one beam is inclined and a distance-measuring light; an emission-direction detecting section for detecting the emission direction of the laser-beam-emitting section; a distance measuring section measuring a distance between the measuring apparatus and the light-receiving apparatus by receiving the distance-measuring light reflected by the light-receiving apparatus; and a wireless communication section for communicating measurement data with the light-receiving apparatus or with the main calculating apparatus, wherein the measurement data includes an angle detected by the emission-direction detecting section and a distance measured by the distance-measuring section; the light-receiving apparatuses each comprising: a reflector reflecting the distance-measuring light in a direction of the measuring apparatus; a light-receiving section for receiving the standard-face-forming laser beam; a light-receiving side control arithmetic section for calculating an elevation angle to the measuring apparatus by light signals of the standard-face-forming laser beam which are received by the light-receiving section, and for calculating a height position by the elevation angle and the distance between the measuring apparatus and the light-receiving apparatus; and a light-receiving side wireless communication section for communicating the measurement data of the measured point with the measuring apparatus or with the main calculating section; the main calculating sections each comprising: a main wireless communication section for communicating with the measuring apparatus or with the light-receiving apparatus; and a main memory for collecting and storing the measurement data that is measured by the measuring apparatus and by a plurality of light-receiving apparatuses.

According to the present invention, measurement data measured by the measuring apparatus and by a plurality of light-receiving apparatuses is collected at one place (the main calculating apparatus). Therefore, no manual labor is necessary for collecting the measurement results of a plurality of light-receiving apparatuses, and the work efficiency is therefore improved.

In a second aspect of the present invention, at least one of the measuring apparatus, the light-receiving apparatus, or the main calculating apparatus collects the measurement data at a control apparatus at a remote location. According to the second aspect, the progress status and the measurement results of the work can be understood at the remote location.

In a third aspect of the present invention, the main calculating apparatus or the control apparatus at a remote location further comprises a display section displaying the measurement data that was collected. According to the third aspect, the measurement result of a plurality of light-receiving apparatuses can be understood at the measurement site. Therefore, the progress status of work can be understood, and remeasurement is not subsequently required, and work efficiency is improved.

In a fourth aspect of the present invention, the display section of the main calculating apparatus or of the control apparatus at a remote location displays tracks of measured points which were measured by each light-receiving apparatus. According to the fourth aspect, a plurality of measured points measured by the plurality of light-receiving apparatuses can be identified easily, so work efficiency is improved.

In a fifth aspect of the present invention, the plural light-receiving apparatuses collect the measurement data in the measuring apparatus. According to the fifth aspect, the main calculating apparatus receives the measurement data from the measuring apparatus according to need. Therefore, measurement workers can understand the measurement results at other light-receiving apparatuses and the progress status of work.

In a sixth aspect of the present invention, the measuring system can select any one of a first mode in which the main calculating apparatus sends a command signal for having the measurement started to the measuring apparatus via the main wireless communication section, and sends positional information of the measured point to the light-receiving apparatus via the main wireless communication section, and the light-receiving apparatus receives, in real time, the measurement data including both an angle and a distance sent from the measuring apparatus, and when the received measurement data is corresponding to the positional information of the measured point, the light-receiving apparatus calculates the elevation angle and determines the height position, and the main calculating apparatus or the measuring apparatus collects three-dimensional position data of the measured point; a second mode in which the main calculating apparatus sends a command signal for having the measurement started to the measuring apparatus via the main wireless communication section, and sends positional information of the measured point to the light-receiving apparatus via the main wireless communication section, and a guidance direction is displayed in a light-receiving side display section of the light-receiving apparatus according to a difference between positional information of the measured point and measurement data of the light-receiving apparatus, and when the positional information of the measured point is corresponding to measurement data of the light-receiving apparatus, the light-receiving apparatus calculates the elevation angle and determines the height position, and the main calculating apparatus or the measuring apparatus collects three-dimensional position data of the measured point; a third mode in which the main memory stores construction data, the main calculating apparatus sends guidance information to the light-receiving apparatus according to positional information of the measured point obtained from the construction data and an angle and a distance measured by the measuring apparatus, and the light-receiving side display section displays the guidance direction, and when the positional information of the measured point is corresponding to measurement data of the light-receiving apparatus, the light-receiving apparatus calculates the elevation angle and determines the height position, and the main calculating apparatus or the measuring apparatus collects three-dimensional position data of the measured point.

According to the sixth aspect, the measuring system has a first mode (self-mode) in which the measurement worker moves by himself to the measured point, a second mode (navigation mode) in which the measurement worker is guided to the measured point, and a third mode (auto-navigation mode) in which the measurement worker is guided to the measured point according to construction data. In any mode, the measurement data is collected at one place (the main calculating apparatus or the measuring apparatus). Therefore, work efficiency is improved.

According to the present invention, in a measuring system that measures positional information of a plurality of measured points at the same time, work efficiency is improved.

DETAILED DESCRIPTION OF THE PREFERRED EMBODIMENTS

The preferred embodiments for carrying out the present invention will be described hereinafter with reference to the drawings.

Figure 1:
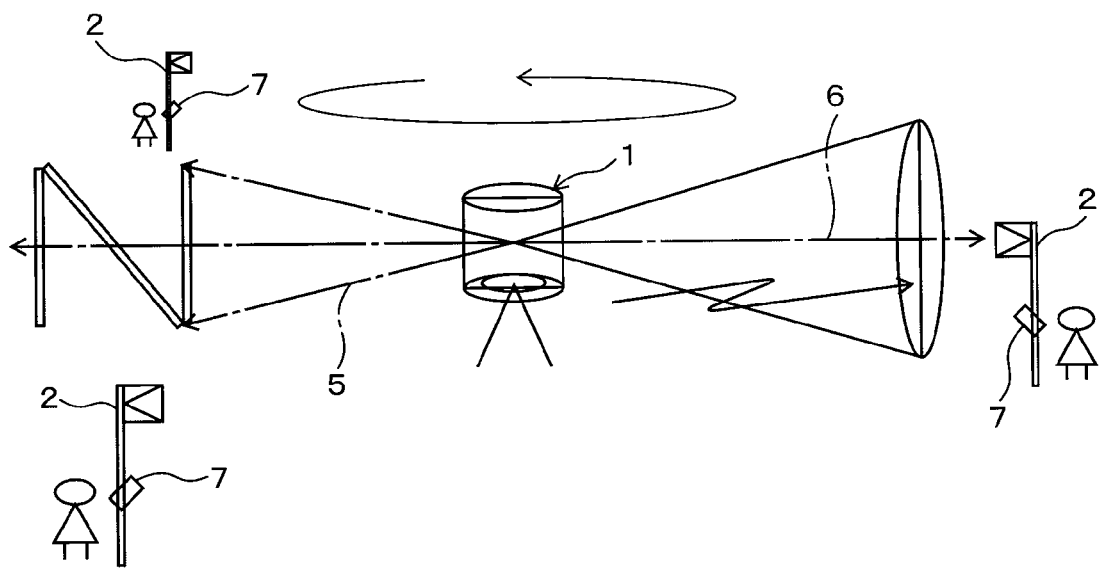
FIG. 1 is a schematic view showing an embodiment of the present invention.
Figure 2:
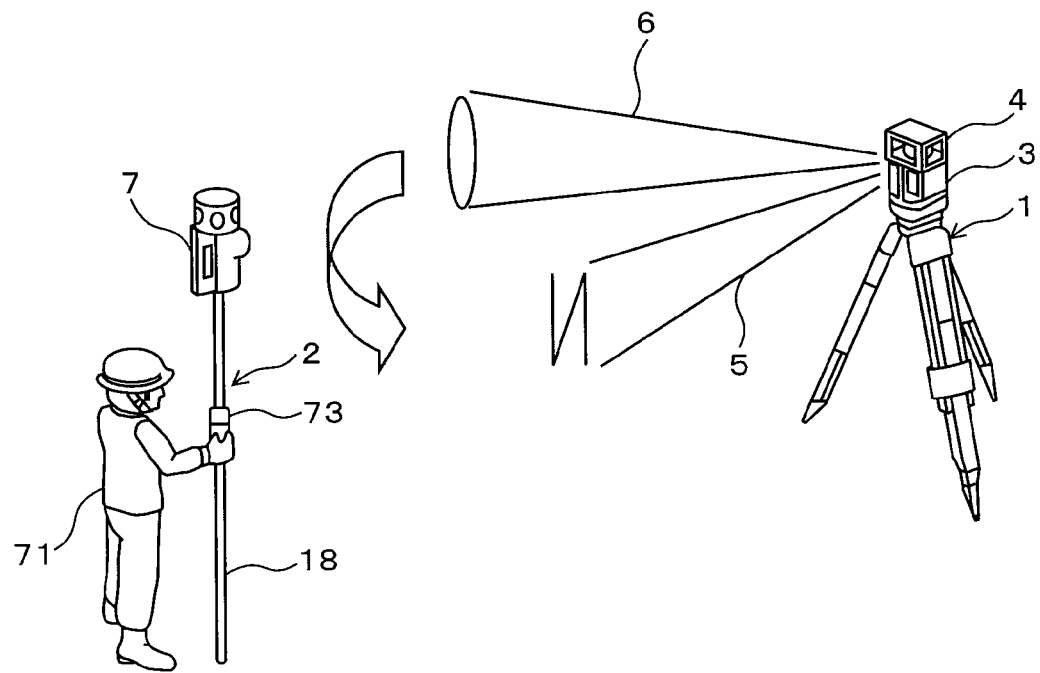
FIG. 2 is an explanatory diagram for explaining an outline of the apparatus composition in an embodiment of the present invention.

First, a measuring system in an embodiment of the present invention will be described with reference to FIGS. 1 and 2. The measuring apparatus 1 shown in FIG. 1 can form a horizontal standard-face, and can measure a distance from the measuring apparatus 1 to a measured object 2.

The measuring apparatus 1 has a standard-face-forming section 3 and a distance measuring section 4. The measuring apparatus 1 is provided at an already-known point, and can emit a standard-face-forming laser beam 5 rotating at a constant speed, and can emit a distance-measuring light 6 rotating. The measuring apparatus 1 receives the distance-measuring light 6 reflected by measured objects 2, and can measure distances from the measuring apparatus 1 to measured objects 2 provided at a plurality of places.

The standard-face-forming section 3 emits the standard-face-forming laser beam 5 composed of two or more fan-shaped laser beams in which at least one beam is inclined and is rotating at a constant speed, and forms a horizontal standard-face. In FIG. 1, the standard-face-forming laser beam 5 is composed of three fan-shaped laser beams, and a cross-section of the luminous flux is in the shape of the letter N. In addition, as a laser apparatus is rotating and is emitting three or more fan-shaped laser beams of which at least one beam is inclined, the present applicant has proposed a laser-rotating apparatus in Japanese Unexamined Patent Application Publication No. 2004-212058.

The standard-face-forming laser beam 5 is rotated and emitted, and when the light-receiving apparatus 7 received two or more fan-shaped laser beams, the light-receiving apparatus 7 of the measured object 2 determines the time difference in the receiving time. As a result, an elevation angle to the horizontal standard-face formed around the measuring apparatus 1 is determined based on the time difference and an inclined angle of the fan-shaped laser beam. In addition, an inclined standard-face can be set to the elevation angle.

Furthermore, the present applicant has disclosed a measuring apparatus for rotating and emitting a laser beam 5 that is in the shape of the letter N and is fan-shaped, and the distance-measuring light 6 in Japanese Unexamined Patent Application Publication No. 2005-165185. The distance-measuring light 6 is rotated and emitted, so distances to a plurality of measured objects 2 can be measured at the same time. Therefore, a height position of the measured object 2 can be measured based on the elevation angle and the distance.

Figure 3:
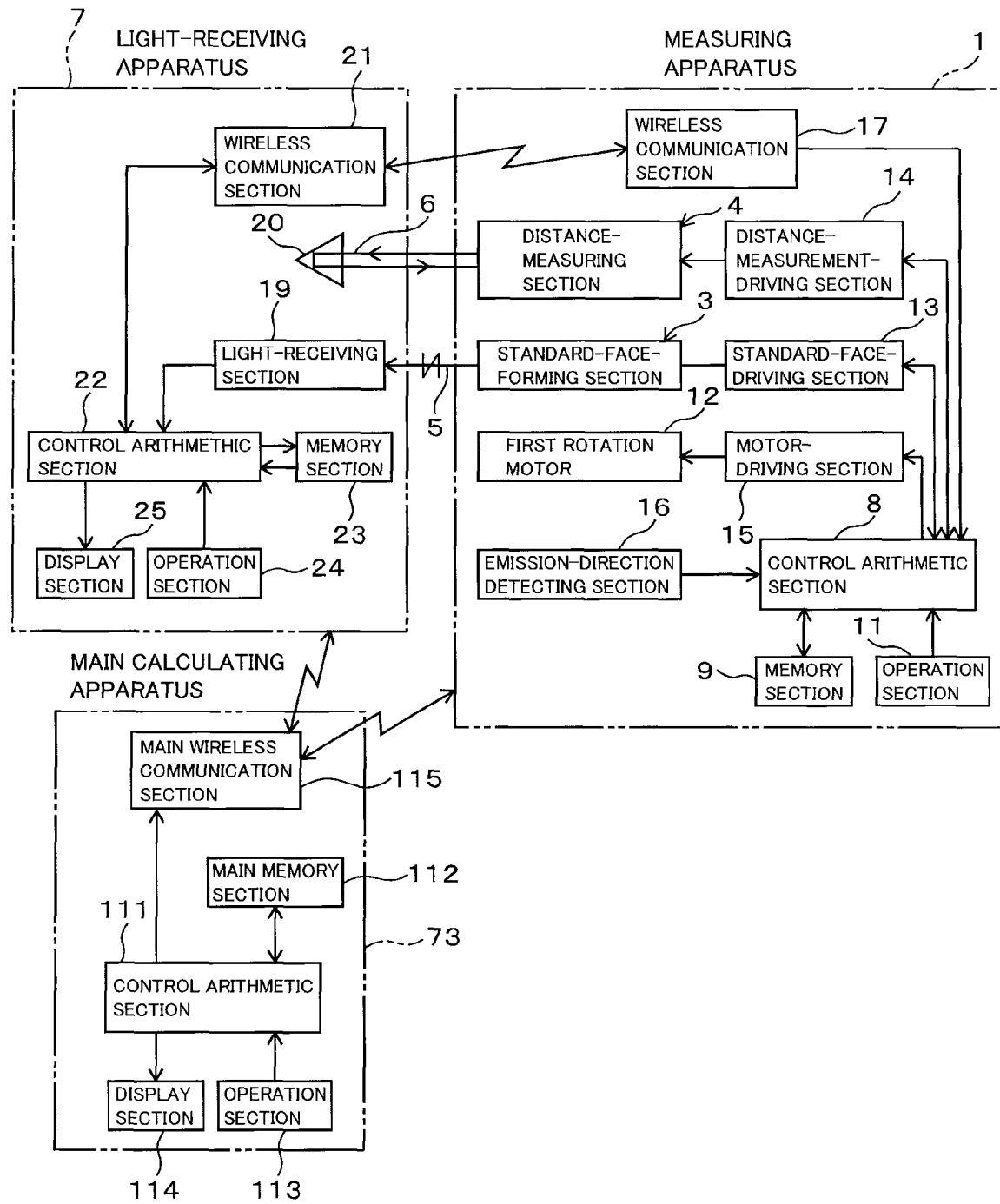
FIG. 3 is a block diagram showing an outline of the apparatus composition in an embodiment of the present invention.

FIG. 3 is a block diagram showing an outline of an apparatus composition in an embodiment of the present invention. The measuring apparatus 1 mainly has a standard-face-forming section 3, a distance-measuring section 4, a control arithmetic section 8, a memory section 9, an operation section 11, a first rotation motor 12 for rotating and emitting the standard-face-forming laser beam 5, a second rotation motor 52 for rotating and emitting the distance-measuring light 6, a standard-face-driving section 13 for driving the standard-face-forming section 3, a motor-driving section 15 for driving the first rotation motor 12 and the second rotation motor 52, a distance-measurement-driving section 14 for driving the distance-measuring section 4, a wireless communication section 17 communicating to the light-receiving section 7, and an emission direction detecting section 16 (a first encoder) for detecting a emission direction (horizontal angle) of the distance-measuring light 6. The standard-face-driving section 13, the distance-measurement-driving section 14, and the motor-driving section 15 is controlled by the control arithmetic section 8.

Moreover, the light-receiving apparatus 7 is provided at an already-known position on a pole 18. The light-receiving apparatus 7 mainly has a light-receiving section 19 receiving the standard-face-forming laser beam 5, a reflector 20, such as a prism, reflecting the distance-measuring light 6, a light-receiving side wireless communication section 21 communicating by wireless with the wireless communication section 17 of the measuring apparatus 1, a light-receiving side control arithmetic section 22, a light-receiving side memory section 23, a light-receiving side operation section 24, a light-receiving side display section 25. In addition, the light-receiving side display section 25 can be a touch panel having a performance of the light-receiving side operation section 24.

Furthermore, the light-receiving side wireless communication section 21 can communicate by wireless with the light-receiving side wireless communication section 21 of another measured object 2.

The light-receiving side memory section 23 stores a calculating program calculating the elevation angle according to the time difference in the receiving-time, a calculating program calculating a height position according to the elevation angle and the distance, a communicating program communicating with the measuring apparatus 1 and with another light-receiving apparatus 7 and with the following main wireless communication section 115, and an image display program displaying a guide content, a work content, a communicating content, etc., in the light-receiving side display section 25. In addition, the light-receiving side memory section 23 stores the measurement data sent from the measuring apparatus 1 and the measurement data obtained from the light-receiving apparatus.

Next, the measuring apparatus used for the measuring system in the present invention will be described.

Figure 4:
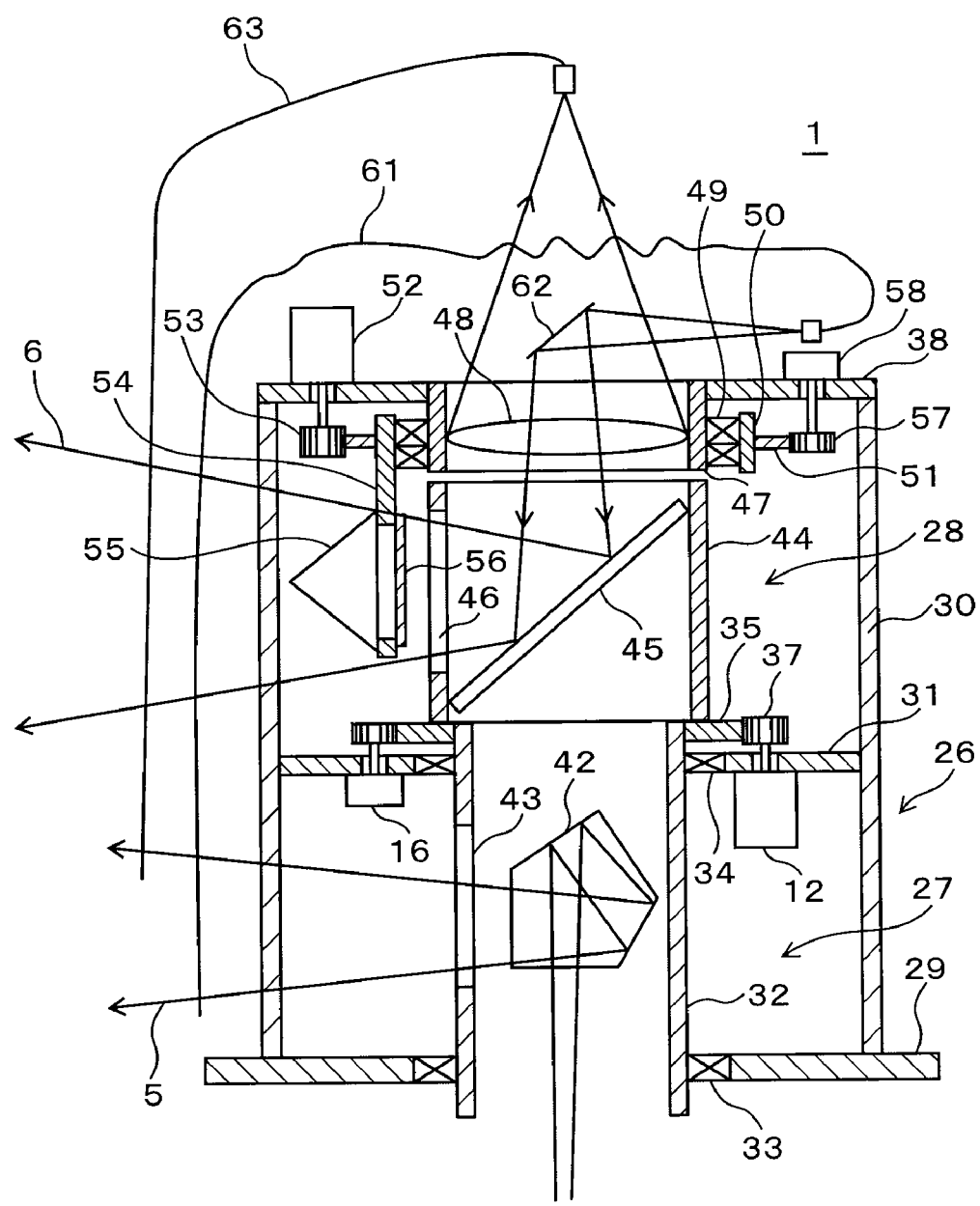
FIG. 4 is a cross-sectional view of a laser-beam-emitting section in an embodiment of the present invention.

FIG. 4 is a cross-sectional view of a laser-beam-emitting section in an embodiment of the present invention. The laser-beam-emitting section 26 is composed of a standard-face-forming laser beam emitting section 27 forming a standard-face and a distance-measuring light emitting section 28. The standard-face-forming laser beam emitting section 27 can emit the standard-face-forming laser beam 5 independently, and the distance-measuring light emitting section 28 can emit the distance-measuring light 6 independently. In addition, an emission direction of the standard-face-forming laser beam 5 is the same as an emission direction of the distance-measuring light 6. These emission directions may not be the same. For example, these emission directions can be 180 degrees in opposite directions.

In FIG. 4, a ceiling 29 is a ceiling of the housing of the measuring apparatus 1, and a laser source section (not showing in FIG. 4) for forming standard-face is provided in the housing. A cylinder-shaped emission window 30 is provided at an upper part of the ceiling 29. The emission window 30 is formed of material such as clear glass, and is provided on the same axis as an optical axis in the standard-face-forming laser beam emitting section 27. An upper substrate 38 is provided at the top of the emission window 30, and a middle substrate 31 is provided in the emission window 30.

A cylinder-shaped prism holder 32 is provided on the same axis as an optical axis in the standard-face-forming laser beam emitting section 27. The prism holder 32 is supported rotatably by the ceiling 29 and the middle substrate 31 via bearings 33 and 34.

A pentaprism 42 is provided in the prism holder 32 as a polarizing optical material. A first emission hole 43 opposed to the pentaprism 42 is provided at the prism holder 32. The standard-face-forming laser beam 5 is output from the laser source section for forming standard-face, and is polarized in a horizontal direction by the pentaprism 42, and is emitted in a horizontal direction through the first emission hole 43.

The first rotation gear 35 is provided at the top of the prism holder 32. The first rotation motor 12 is provided at the middle substrate 31. The first rotation gear 35 engages the first driven gear 37 fixed in the output axis of the first rotation motor 12. The first driven gear 37 rotates by driving the first rotation motor 12. The pentaprism 42 rotates via the first rotation gear 35 and via the prism holder 32. As a result, the standard-face-forming laser beam 5 is rotated in a horizontal plane.

Moreover, the emission direction detecting section 16 is provided at the middle substrate 31. The emission direction detecting section 16 detects a rotation angle of the first rotation gear 35. The emission directions of the standard-face-forming laser beam 5 and the distance-measuring light 6 are detected by the rotation angle.

A mirror holder 44 is provided at an upper part of the prism holder 32 on the same axis as a rotation axis of the prism holder 32. The mirror holder 44 has a reflecting mirror 45 as a polarizing optical material. The second emission hole 46 is provided at a part opposed to the reflection side of reflecting mirror 45. The mirror holder 44 and the prism holder 32 is integrated. The pentaprism 42 and the reflecting mirror 45 rotate as one body around the same optical axis. If these rotate around the same optical axis, it is not required that these rotate unitarily.

A mirror cylinder 47 is provided in the upper substrate 38. The center of the mirror cylinder 47 corresponds to the center of mirror holder 44. In addition, the mirror cylinder 47 supports a collective lens 48. A rotation ring 50 is rotatably provided at the mirror cylinder 47 via a bearing 49. A second rotation gear 51 is fixed to the rotation ring 50.

A second rotation motor 52 is provided at the upper substrate 38. A second driving gear 53 is fixed to the output axis of the second rotation motor 52. The second driving gear 53 engages with the second rotation gear 51.

Moreover, a reflection prism supporting part 54 is fixed to the rotation ring 50. A standard reflection prism 55 used for an internal optical path as a standard reflection part is fixed to the reflection prism supporting part 54. An amplitude filter 56 (optical density filter) is provided on the internal optical path, for example, on the reflection side of the standard reflection prism 55. The density of the amplitude filter 56 changes continuously in a horizontal direction (in a rotating direction). The penetration quantity of a laser beam decreases continuously or increases continuously. Moreover, the density of amplitude filter 56 can gradually change. The density has to only change substantially and gradually in the rotating direction.

Specifically, the standard reflection prism 55 is assumed to be a corner-cube. In addition, an optical filter, in which the permeability in the vicinity of the center is high and the permeability is low according to travel to the surroundings, is affixed to the corner-cube.

The second encoder 58 is provided at the upper substrate 38. The second driven gear 57 is fixed to the input axis of the second encoder 58. The second driven gear 57 engages with the second rotation gear 51.

When the second rotation motor 52 is driven, the standard reflection prism 55 rotates unitarily with the amplitude filter 56 via the second driving gear 53 and the second rotation gear 51 and the rotation ring 50. In addition, the second encoder 58 detects a rotation angle of the rotation ring 50 via the second rotation gear 51 and the second driven gear 57.

A deflection mirror 62 is provided on an optical axis of the collective lens 48. An output edge of an optical fiber 61 for outputting light is positioned at the position opposed to the reflection side of the deflection mirror 62. In addition, an input edge of an optical fiber 63 for receiving light is positioned at the collective position on an optical axis of the collective lens 48.

When the distance-measuring light 6 is output from a light emission element 59 (refer to the following description), the optical fiber 61 for outputting light leads the distance-measuring light 6 to the deflection mirror 62. The optical fiber 63 for receiving light leads the reflected distance-measuring light 6' and the internal reference light 6'' to the light-detecting element 65 (see the following description).

A method for measuring an elevation angle of light-receiving apparatus 7 to the measuring apparatus 1, that is, to the laser-beam-emitting section 26, is described with reference to FIG. 5 to FIGS. 9A and 9B.

Figure 5:
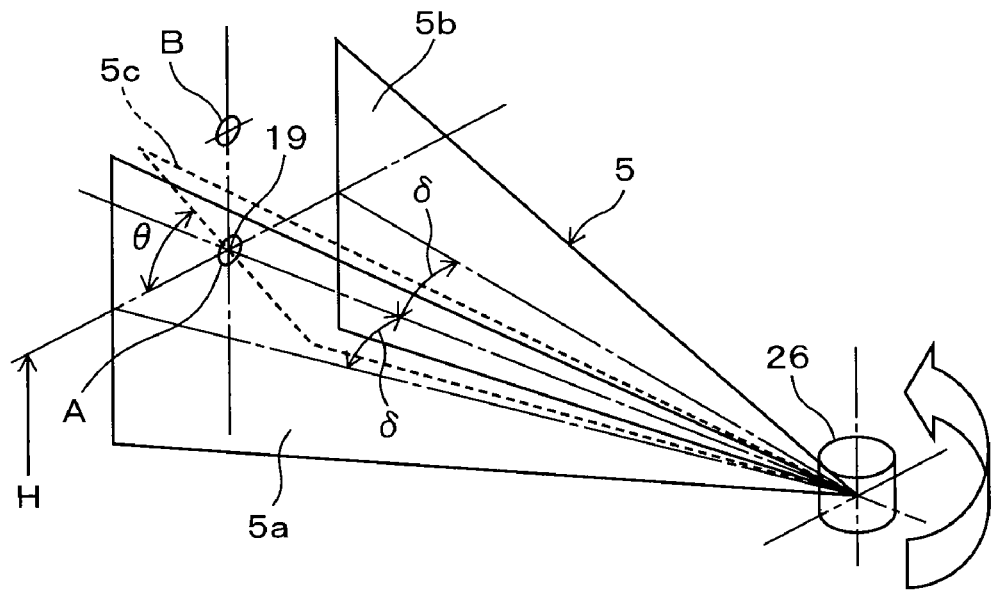
FIG. 5 is an explanatory diagram for explaining a method for calculating an elevation angle in an embodiment of the present invention.

Hereinafter, the elevation angle γ and a vertical interval H to a horizontal line at the position of the light-receiving apparatus 7 are described with reference to FIG. 5. FIG. 5 shows a relationship between the light-receiving section 19 and the standard-face-forming laser beam 5. A height position of the laser-beam-emitting section 26 is measured beforehand, and is known already.

When the standard-face-forming laser beam 5 is rotated and emitted, the standard-face-forming laser beam 5 crosses the light-receiving section 19. The standard-face-forming laser beam 5 is composed of the fan-shaped laser beams 5a, 5b, and 5c. Therefore, if the light-receiving section 19 is a punctate light-detecting element, the light-receiving section 19 can receive the standard-face-forming laser beam 5. Accurate matching of the position of the light-receiving apparatus 7 is not required.

When the standard-face-forming laser beam 5 crosses the light-receiving section 19, each of the fan-shaped laser beams 5a, 5b, and 5c passes over the light-receiving section 19. Three light signals 40a, 40c, and 40b corresponding to each of the fan-shaped laser beams 5a, 5b, and 5c are output from the light-receiving section 19.

Figure 9A:
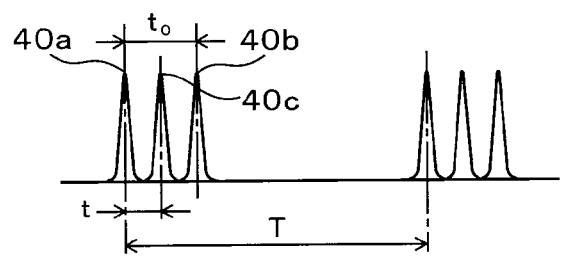
FIGS. 9A and 9B are explanatory diagrams for explaining a method for calculating an elevation angle in an embodiment of the present invention.

When the light-receiving section 19 exists at the position of point A in positional relation to the standard-face-forming laser beam 5 shown in FIG. 5 to FIG. 8, that is, when the light-receiving section 19 exists at the center of the standard-face-forming laser beam 5, three time intervals among light signals 40a, 40c, and 40b are equal as shown in FIG. 9A. In FIG. 9A, T indicates a cycle for one-rotation of the standard-face-forming laser beam 5.

Figure 6:
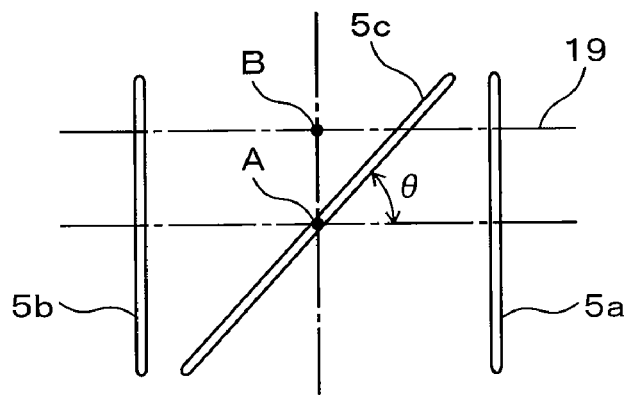
FIG. 6 is an explanatory diagram for explaining a method for calculating an elevation angle in an embodiment of the present invention.
Figure 7:
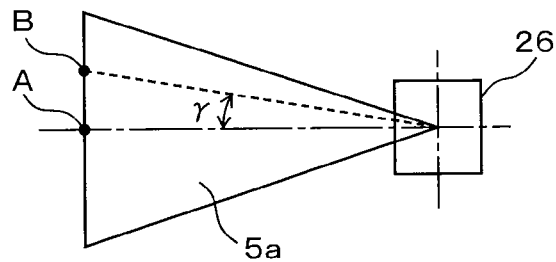
FIG. 7 is an explanatory diagram for explaining a method for calculating an elevation angle in an embodiment of the present invention.
Figure 8:
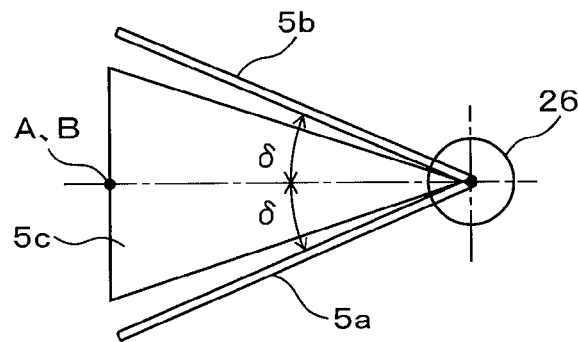
FIG. 8 is an explanatory diagram for explaining a method for calculating an elevation angle in an embodiment of the present invention.
Figure 9B:
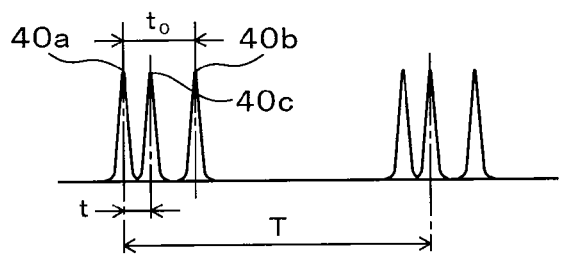

Moreover, when the light-receiving section 19 shifts from the center of the standard-face-forming laser beam 5 and exists at the position of point B shown in FIG. 5 to FIG. 8, time intervals among light signals 40a, 40c, and 40b are different (see FIG. 9B). In FIG. 6, when the light-receiving section 19 moves relatively from right to left, the time interval between light signals 40a and 40c is short, and the time interval between light signals 40c and 40b is long.

The sectional shape of the luminous flux of the standard-face-forming laser beam 5 shown in FIG. 6 is a similar figure regardless of the distance between the light-receiving apparatus 7 and the laser-beam-emitting section 26. Therefore, the passing position of the light-receiving section 19 in the dimensionless figure can be calculated by determining a ratio of the time intervals. In addition, the elevation angle γ from the center of the measuring apparatus 1 to the position of point B can be calculated at once. Moreover, a vertical interval H from a horizontal line at the position of the light-receiving apparatus 7 can be measured according to the elevation angle γ and the distance L between the laser-beam-emitting section 26 and the light-receiving apparatus 7.

As mentioned above, a shape composed of two or more fan-shaped laser beams may be in the shape of the letter N. At least one beam is inclined, and shape information such as the inclined angle has to only be already known.

Figure 10:
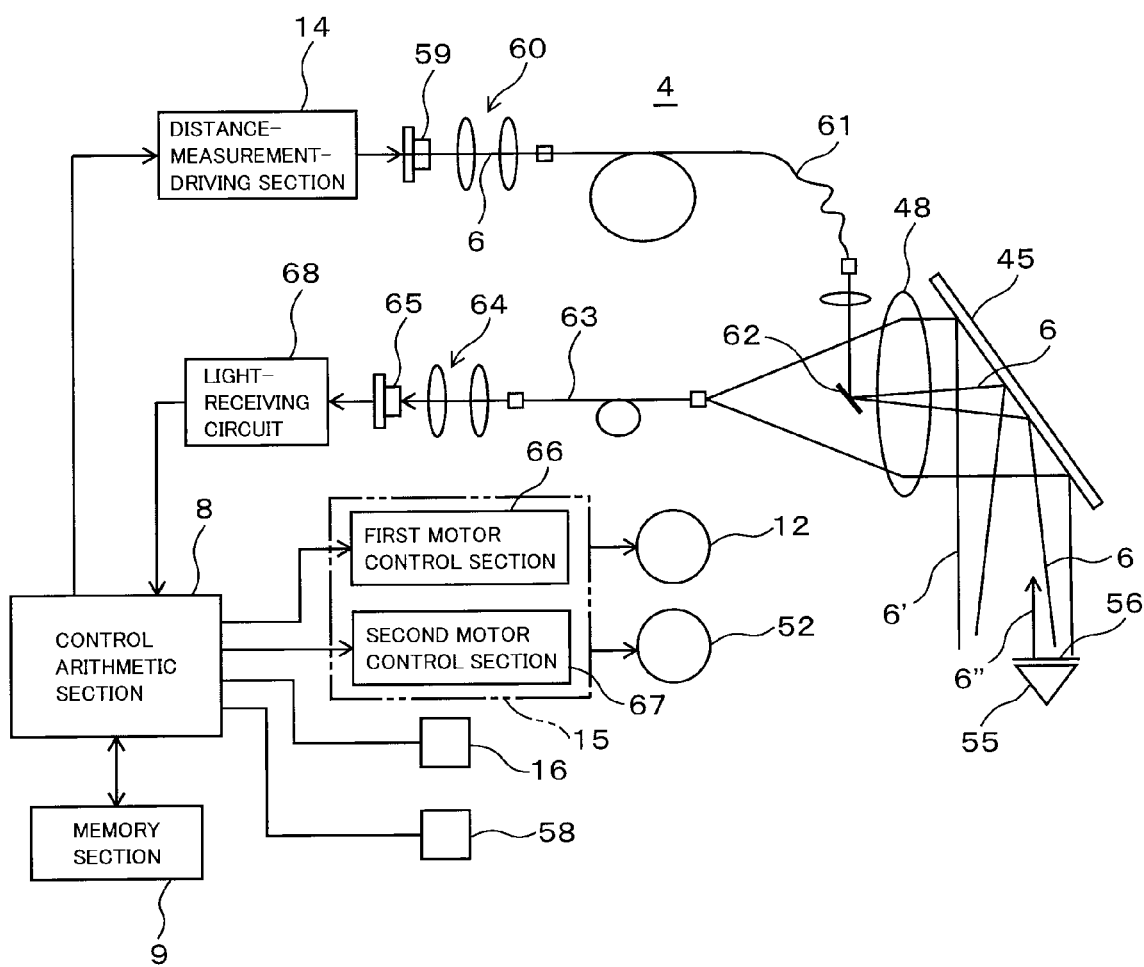
FIG. 10 is a block diagram showing an outline of a distance-measuring section in an embodiment of the present invention.

The distance-measuring section 4 is described with reference to FIG. 10.

The collective lens 60 is provided on an output optical axis of the light emission element 59. An input edge of the optical fiber 61 for outputting light is arranged at the collective position of the collective lens 60. The optical fiber 61 for outputting light leads distance-measuring light 6 to the deflection mirror 62 as mentioned above.

The input edge of the optical fiber 63 for receiving light is arranged at the collective position of the collective lens 48. The output edge of the optical fiber 63 for receiving light is arranged on an optical axis of a collective lens 64. The reflected distance-measuring light 6' and the internal reference light 6" output from the optical fiber 63 for receiving light is collected in the light-detecting element 65 by the collective lens 64.

The distance-measurement-driving section 14 controls the luminescence of the light emission element 59 based on the control signal from the control arithmetic section 8. Moreover, a light-receiving circuit 68 executes a predetermined processing such as amplification and A/D conversion of light signals detected in the light-detecting element 65. The processed signals are sent to the control arithmetic section 8.

The control arithmetic section 8 has the memory section 9. The memory section 9 stores computer-readable programs such as a distance-measuring program for calculating a distance or a sequence program for carrying out the measurement, and a communication program for communicating with a light-receiving apparatus 7 by wireless. Moreover, the memory section 9 stores geographical data including measurement ranges and data concerning the measurement schedule for setting measured points. In addition, the memory section 9 stores a change of quantities of light based on detected light signals in the light-detecting element 65, and further stores data under the measurement, etc.

The control arithmetic section 8 sends the control signals to the first motor control section 66 for the first rotation motor 12 and the second motor control section 67 for the second rotation motor 52 according to the sequence program. The first motor control section 66 controls the rotation and stopping of the first rotation motor 12, and the second motor control section 67 controls the rotation and stopping of the second rotation motor 52.

The emission direction detecting section 16 detects a rotation angle of the mirror holder 44, and sends the rotation angle to the control arithmetic section 8. The second encoder 58 detects a rotation angle of the mirror holder 44 of the standard reflection prism 55, and inputs the rotation angle to the control arithmetic section 8.

An action of the measurement will be described hereinafter.

The light intensity of the light emission element 59 is modulated at a constant frequency by the distance-measurement-driving section 14. The light emission element 59 emits light and outputs the distance-measuring laser beam. The laser beam from the light emission element 59 is collected in the input edge of the optical fiber 61 for outputting light. The laser beam led to the optical fiber 61 is output from the output edge as the distance-measuring light 6, and the distance-measuring light 6 is reflected on the optical axis of the collective lens 48 by the deflection mirror 62. In addition, the distance-measuring light 6 is collected by the collective lens 48, and enters the reflecting mirror 45, and is deflected by the reflecting mirror 45, and is emitted from the emission window 30 in a horizontal direction as the fan-shaped laser beam having a predetermined extension angle.

When the distance-measuring light 6 and the standard-face-forming laser beam 5 is emitted, the first rotation motor 12 drives. The pentaprism 42 and the reflecting mirror 45 rotate via the first driven gear 37 and the first rotation gear 35. The standard-face-forming laser beam 5 and the distance-measuring light 6 are emitted while rotating, or they are scanned round-trip in a measurement area in which at least the measured object 2 exists.

When the distance-measurement is carried out, that is, the distance-measuring light 6 is emitted, the standard reflection prism 55 rotates by the second rotation motor 52 and comes off from the direction of the measured object 2, that is, from the direction of distance-measurement. Then, the second rotation motor 52 stops, and the standard reflection prism 55 is supported at a predetermined position that does not influence the measurement.

Furthermore, there are two or more measured objects 2, and when the measurement is not possible if the standard reflection prism 55 is supported at the predetermined position, the standard reflection prism 55 can also rotate according to the rotation of the reflecting mirror 45. In this case, the measurement direction and the position of the standard reflection prism 55 do not overlap. That is, a direction in which the measured object 2 exists can be detected by the emission direction detecting section 16, so the direction of the measured object 2 is determined beforehand by rotating and scanning. Then, the standard reflection prism 55 can move to a position that derived from the measurement direction according to the result detected by the second encoder 58.

The distance-measuring light 6 is emitted at a constant speed while rotating, and crosses the measured object 2, and is reflected by the measured object 2. The distance-measuring light 6' reflected by the measured object 2 enters the reflecting mirror 45, and it is reflected by the reflecting mirror 45. Moreover, the distance-measuring light 6' is collected by the collective lens 48, and enters the input edge of the optical fiber 63. The distance-measuring light 6' is output from the optical fiber 63, and is collected by the collective lens 64, and is received by the light-detecting element 65. The light signals detected by the light-detecting element 65 is amplified, and is converted from analog to digital, and is sent to the control arithmetic section 8, and is stored in the memory section 9 via the control arithmetic section 8.

Moreover, the distance-measuring light 6 passes through the standard reflection prism 55, and is reflected by the standard reflection prism 55 in the passing process. The laser beam reflected by the standard reflection prism 55 is further reflected by the reflecting mirror 45, and is received by the light-detecting element 65 via the collective lens 48 and the optical fiber 63 as the internal reference light 6".

At this time, an optical path that connects to the light detecting element 65 via the optical fiber 61 for outputting light, the reflecting mirror 45, the standard reflection prism 55, and the reflecting mirror 45, is the internal reference optical path. In addition, a length of this internal reference optical path is set as a forecast value or an already-known actual measurement value.

Furthermore, the amplitude filter 56 is provided on the reflection side of the standard reflection prism 55. When the distance-measuring light 6 crosses the amplitude filter 56, the distance-measuring light 6, with differing quantities of light, is reflected by the standard reflection prism 55. The light-detecting element 65 receives the internal reference light 6" with the differing light intensities, and outputs the detected light signals with the differing light intensities. Moreover, the range of the light intensities in the amplitude filter 56 can be set to any value in the dynamic range, or be set to a maximum value in the dynamic range of the light receiving section.

The light signals detected in the light detecting element 65 are input to the light-receiving side circuit 68. The light-receiving side circuit 68 executes predetermined processes such as amplification and A/D conversion of light signals of the reflected distance-measuring light 6' and of the internal reference light 6". The processed signals are sent to the control arithmetic section 8, and are stored in the memory section 9. The control arithmetic section 8 calculates a phase difference between the reflected distance-measuring light 6' and internal reference light 6". The phase difference is calculated based on light signals stored in the memory section 9 by the distance-measuring program stored in the memory section 9. The distance to the measured object 2 is calculated based on the phase difference and light speed.

The light intensity of the reflected distance-measuring light 6' changes according to the distance to the measured object 2. That is, when the distance to the measured object 2 is short, the light intensity of the reflected distance-measuring light 6' is strong, and when the distance to the measured object 2 is long, the light intensity of the reflected distance-measuring light 6' is weak. Therefore, in order to calculate the phase difference accurately by comparing the internal reference light 6" with the reflected distance-measuring light 6', the light intensity of the internal reference light 6" has to be equal to the light intensity of the reflected distance-measuring light 6' in the light-detecting element 65.

The change over time of quantities of light based on light signals from the light detecting element 65 is stored in the memory section 9. The light signal that is equal to the light intensity of the reflected distance-measuring light 6', or the light signal that is almost equal to the light intensity of the reflected distance-measuring light 6', is extracted from the stored light signals. The extracted light signal is assumed to be the light signal of the reflected distance-measuring light 6' for the measurement.

Furthermore, the internal reference light having appropriate light intensity can be obtained without exchange of the optical path.

The measured distance data is sent from the wireless communication section 17 to the light-receiving side wireless communication section 21. The measured distance data received in the light-receiving side wireless communication section 21 is stored in the light-receiving side memory section 23.

The standard-face-forming laser beam 5 is emitted while rotating, and the standard-face-forming laser beam 5 crosses the measured object 2. The light-receiving section 19 receives three fan-shaped laser beams respectively, and outputs light signals of the fan-shaped laser beams. The light-receiving side control arithmetic section 22 calculates time intervals of light signals (time differences of light signals). The height position of the light-receiving section 19 is determined based on the elevation angle and the distance between the measuring apparatus 1 and the measured object 2 (see FIG. 3).

As a result, three-dimensional positional data of the measured point can be acquired.

The measuring system also has an arithmetic section such as a small PC as a main arithmetic device for directing the measuring work. As a small PC, for example, a portable PDA 73 (see FIG. 2) may be mentioned. The PDA 73 can be provided at the pole 18 of the measured object 2, or the measurement worker can carry the PDA 73. In addition, the light-receiving apparatus 7 of the measured object 2 can have the function as the main arithmetic device.

The outline of the PDA 73 is described hereinafter.

The PDA 73 mainly has a control arithmetic section 111, a main memory section 112, an operation section 113, a display section 114, and a main wireless communication section 115. The main wireless communication section 115 can communicate with the measuring apparatus 1 via the wireless communication section 17, and can communicate with the light-receiving apparatus 7 via the light-receiving side wireless communication section 21. The main memory section 112 stores a communication program, and an image display program for displaying a working content and a communicating content in the display section 114. In addition, the main memory section 112 stores a guidance program for carrying out guidance for each measurement, which is a completed-shape measurement for measuring a completed shape of the construction, a sectional measurement for making a sectional view of terrain, a measurement setting for setting the measurement poles, and a current state measurement for measuring a current state of the land surface. Moreover, the main memory section 112 stores an auto-navigation program, and a mode selection program for selecting each measurement mode, and a menu program for displaying the guidance of each measurement mode in the display section 114. Furthermore, the main memory section 112 stores a regional map for the measurement, design data for the construction, distance data which is sent from the measuring apparatus 1, and elevation angle data which is obtained from the light-receiving apparatus 7 (see FIG. 3).

The display section 114 can be independently provided, or the display section 114 can further have the function of the operation section like a touch panel.

Next, the action of the measuring system which has the measuring apparatus 1 and a plurality of measured objects 2, and which measures a plurality of measured points at the same time, is described hereinafter referring to FIG. 11 to FIG. 18.

Figure 13:
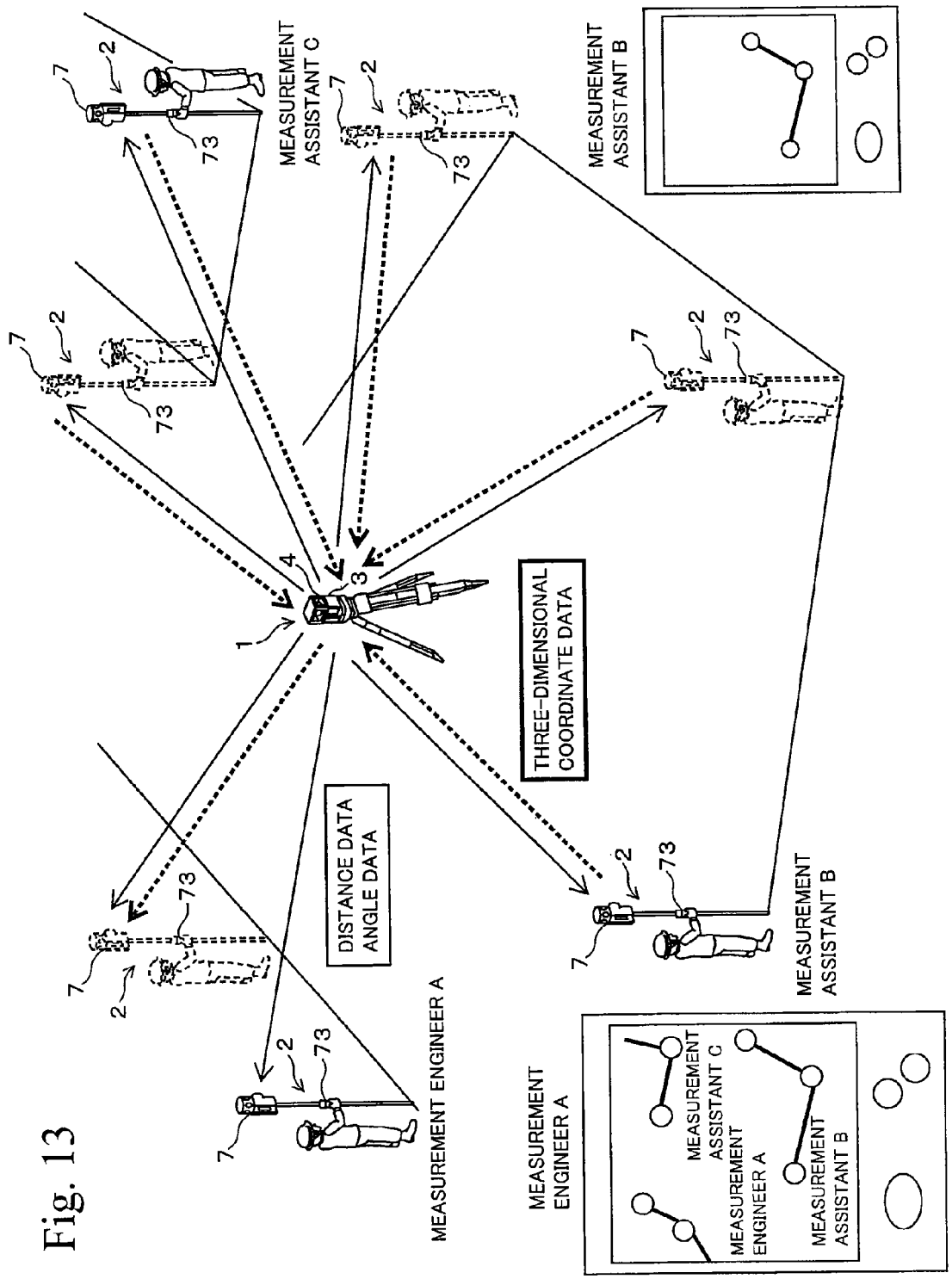
FIG. 13 is a diagram showing a data flow in a self-mode.

The measured object 2 is supported by the measurement engineer A and the measurement assistants B and C who assist the measurement engineer A as shown in FIG. 13. The measured object 2 has the light-receiving apparatus 7 and the arithmetic device such as a small PC, for example, the PDA 73.

The PDA 73 and the light-receiving apparatus 7 and the measuring apparatus 1 can communicate by wireless mutually and individually. The wireless communication can be composed of a wireless LAN in which the measuring apparatus 1 works as a server.

Moreover, data can be transferred directly between the light-receiving apparatus 7 and the other light-receiving apparatus 7. Furthermore, data can be transferred between the light-receiving apparatus 7 and another light-receiving apparatus 7 via the measuring apparatus 1.

In the following explanations, the display section 114 of the PDA 73 is a touch panel, and the display section 114 further has a function of the operation section 24 of the light-receiving apparatus 7.

A screen corresponding to the working content is displayed in the display section 114. Moreover, the screen is switched according to the working content.

Figure 11:
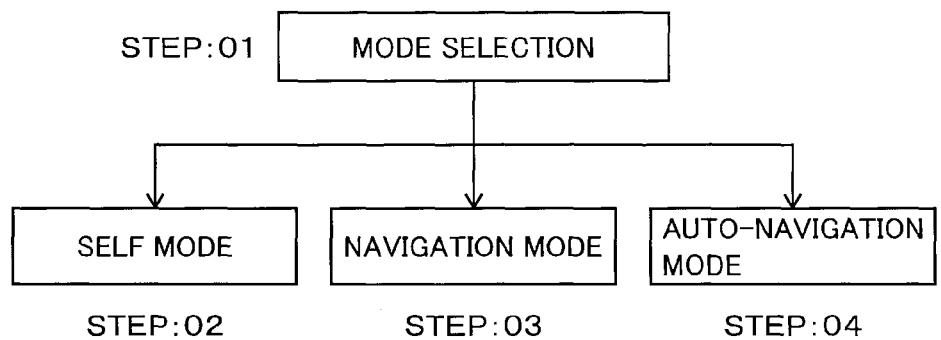
FIG. 11 is a diagram showing a mode selection in an embodiment of the present invention.

As shown in FIG. 11, the self-mode, the navigation mode, and the auto-navigation mode can be selected by the display section 114 of the PDA 73.

Figure 12:
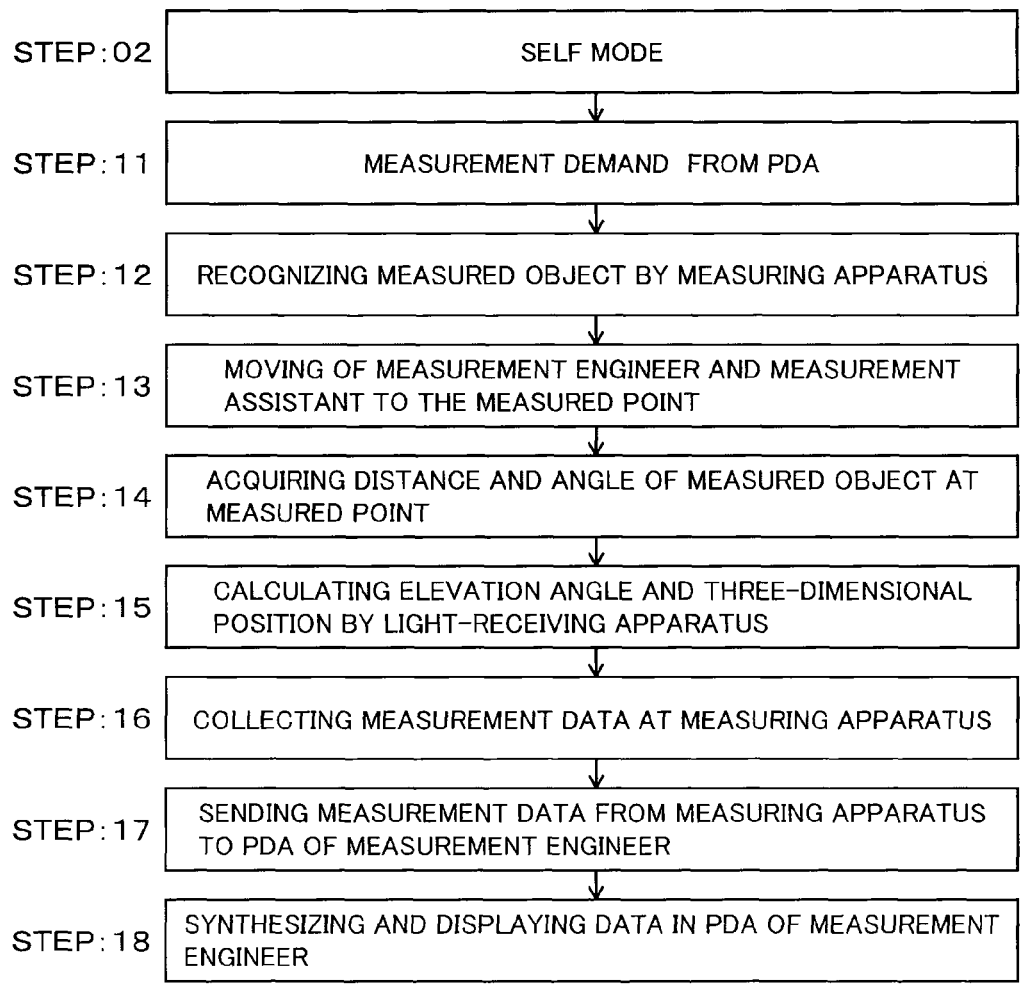
FIG. 12 is a flowchart in a case in which a self-mode was selected.

First of all, the self-mode is explained referring to FIGS. 12 and 13.

The measurement engineer A and the measurement assistants B and C select the self-mode in the PDA 73 (STEP 02). The measurement demand is sent from the PDA 73 to the measuring apparatus 1 (STEP 11). The measuring apparatus 1 begins to measure the distance, and the measuring apparatus 1 recognizes the measured object 2 (light-receiving apparatus 7) (STEP 12).

The light-receiving apparatus 7 receives in real time the measurement result of the distance and the angle from the measuring apparatus 1. The measurement result of the distance and the angle are displayed in the display section 25 of the light-receiving apparatus 7. The measurement engineer A and the measurement assistants B and C confirm their own positions by the measurement result in the display section 25, and move to the measured point (STEP 13).

When the position of the light-receiving apparatus 7 is corresponding to the position of the measured point, or when the position of the light-receiving apparatus 7 is in the tolerance range (matching), the light-receiving apparatus 7 acquires distance data showing a distance from the measuring apparatus 1 to the measured point and angle data showing a horizontal angle from the measuring apparatus 1 to the measured point (STEP 14). Moreover, the light-receiving apparatus 7 calculates the elevation angle to the measuring apparatus 1 by detecting the standard-face-forming laser beam 5, and calculates the height position of the light-receiving apparatus 7 according to the distance data and the elevation angle. As a result, three-dimensional positional data is calculated based on the distance data, the angle data, and the height position (STEP 15).

When the light-receiving apparatus 7 finishes calculating, the measurement data such as three-dimensional positional data of measured points of the measurement engineer A and the measurement assistants B and C are sent and collected at the measuring apparatus 1 (STEP 16). In this case, the light-receiving apparatus 7 sends a measurement-completed signal to the PDAs 73 of the measurement engineer A and the measurement assistants B and C. The measuring apparatus 1 which received the measurement data stores three-dimensional coordinate data of measured points in the memory section 9 with a construction name, a measurement worker name, a measurement time, and an identification data of the light-receiving apparatus 7. As a result, the PDAs 73 of the measurement engineer A and the measurement assistants B and C can acquire the measurement data from the measuring apparatus 1 at any time.

The measuring apparatus 1 sends the measured point data of the measurement assistants B and C to the PDA 73 of the measurement engineer A (STEP 17). In addition, the light-receiving apparatus 7 can directly send the measured point data of the measurement assistants B and C to the PDA 73 of the measurement engineer A without the measuring apparatus 1. The PDA 73 of the measurement engineer A stores the measured point data in the main memory section 112.

In the PDA 73 of the measurement engineer A, as shown in FIG. 13, three-dimensional coordinate data of measured points of the measurement engineer A and the measurement assistants B and C are synthesized in the same three-dimensional space and are displayed (STEP 18). In this case, measured points, positional coordinates of measured points, names of measurement workers, etc., are displayed. As a result, the measurement engineer A can understand the progress status of the work.

When the measurement of one measured point is completed, the measurement engineer A and the measurement assistants B and C move to the next measured point and send the measurement demand from the PDA 73 to measuring apparatus 1. As a result, the measurement continues. Moreover, as shown in FIG. 13, every time the measurement continues, the PDA 73 of the measurement engineer A can display the tracks of measured points. The tracks are graphs that connect the measured points of the measurement engineer A and the measurement assistants B and C by a straight line in each light-receiving apparatus 7. In addition, the PDAs 73 of the measurement assistants B and C can display the tracks of their own measured points.

Figure 14:
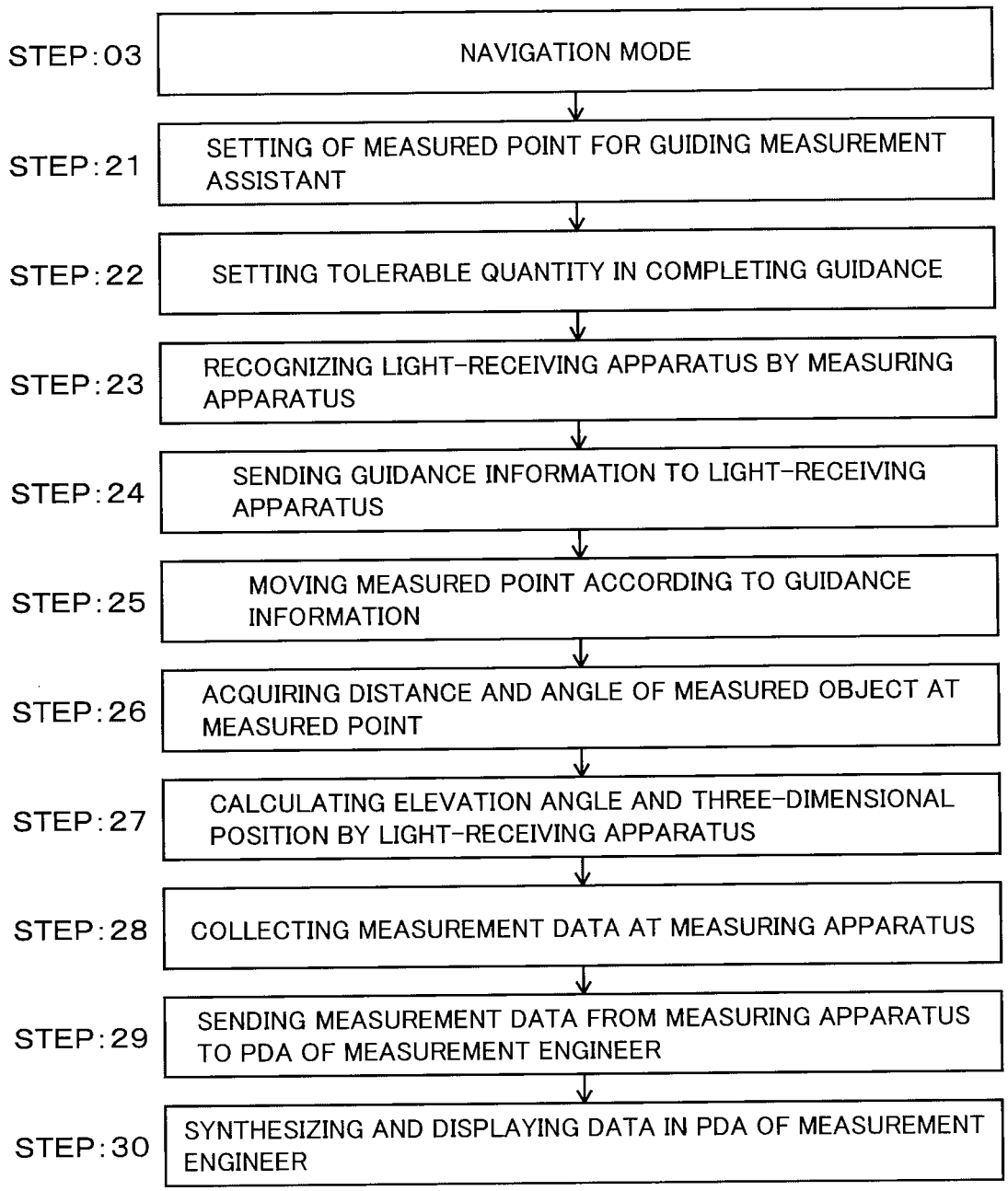
FIG. 14 is a flowchart in a case in which a navigation mode was selected.
Figure 15:
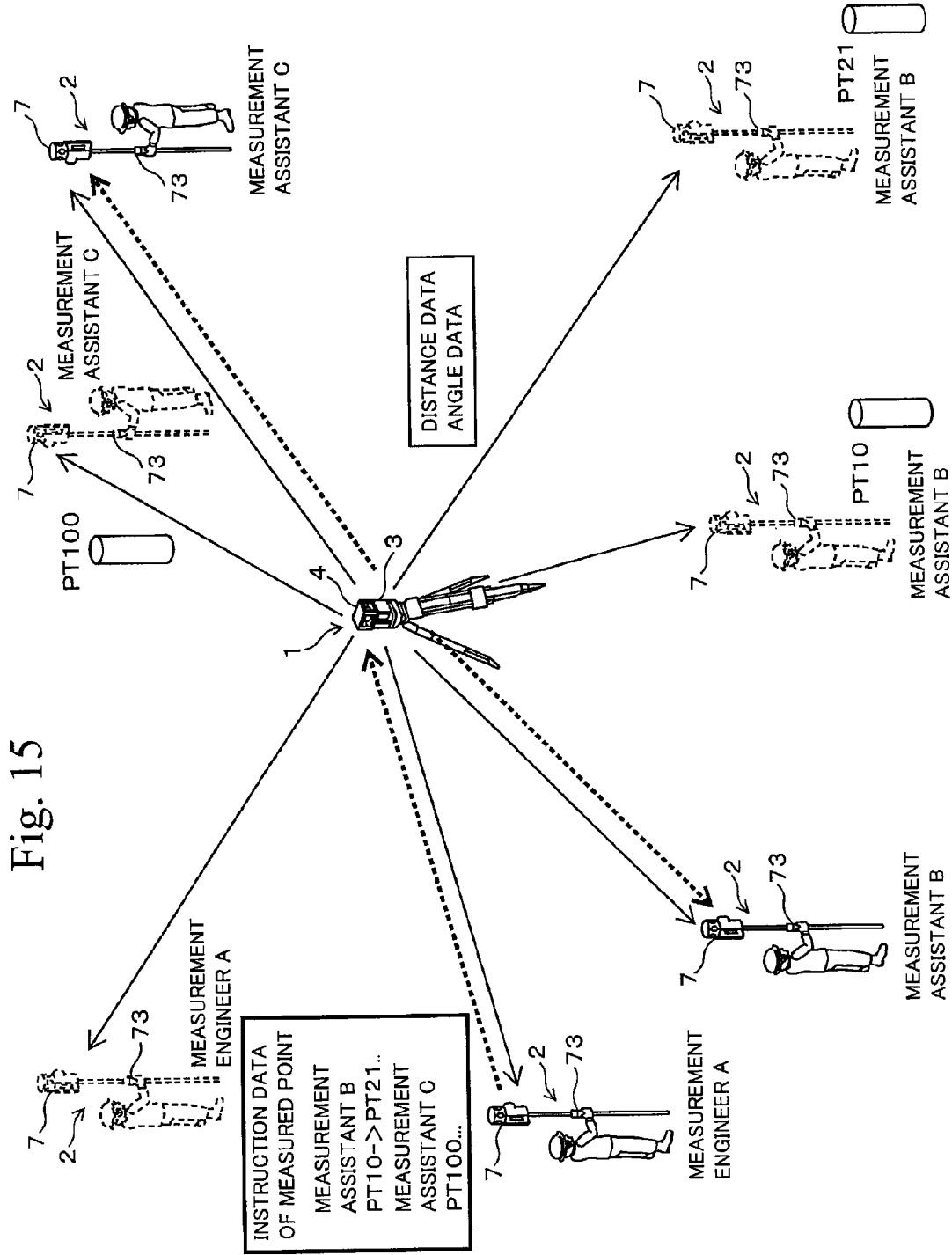
FIG. 15 is a diagram showing a data flow in a navigation mode.

Next, the case in which the navigation mode is selected is described hereinafter with reference to FIGS. 14 and 15.

The measurement engineer A selects the navigation mode by the PDA 73 (STEP 03).

In order to guide the measurement assistants B and C to the measured point, the measurement engineer A inputs the instruction data of the measured point. For example, an identified number of the measured point, a position of the measured point in the construction data, and a tolerable quantity between the position of the measured point in the construction data and a position of the actual measured point when the guidance is completed (when an actual measured point is decided), are set (STEP 21, STEP 22). For example, as shown in FIG. 15, the measurement engineer A sets the measured point PT10, the measured point PT21, . . . , to the measurement assistant B. In addition, the measurement engineer A sets the measured point PT100, . . . , to the measurement assistant C.

When the setting is completed, the measuring apparatus 1 begins to measure and recognizes the light-receiving apparatus 7 (STEP 23). The guidance information corresponding to each light-receiving apparatus 7 is sent from the PDA 73 of the measurement engineer A (STEP 24).

While guiding, the position of the light-receiving apparatus 7 is continuously measured by the measuring apparatus 1. The measurement result is sent to the light-receiving apparatus 7 in real time. The light-receiving apparatus 7 compares the measurement result with the guidance information and calculates a guidance direction.

Furthermore, the measuring apparatus 1 can send in real time the positional information of the light-receiving apparatus 7 to the PDAs 73 of the measurement assistants B and C. In this case, the PDA 73 can calculate the guidance direction according to the difference between the measured point and the measured position, and sent a guidance signal to the light-receiving apparatus 7.

The arrow showing the guidance direction is displayed in the PDAs 73 of the measurement assistants B and C according to the calculation of the guidance direction. The measurement assistants B and C move in the arrow direction (STEP 25). When the position of the light-receiving apparatus 7 is in a range of the tolerable quantity (matching), the measurement assistants B and C are notified to have completed the guidance. Moreover, the arrow can turn on and off, and the turning interval can be shortened as the measured point is approached.

The light-receiving apparatus 7 acquires the measurement result of the distance and the angle when matching (STEP 26).

The light-receiving apparatus 7 calculates the elevation angle to the measuring apparatus 1 by detecting the standard-face-forming laser beam 5, and calculates the height position of the light-receiving apparatus 7 according to the distance data and the elevation angle. As a result, three-dimensional position data is calculated based on the angle data, the distance data, and the height position (STEP 27).

When the light-receiving apparatus 7 finishes calculating, the measured point data of the measurement engineer A and the measurement assistants B and C are sent to the measuring apparatus 1 and are collected (STEP 28). In this case, the light-receiving apparatus 7 sends a measurement completion signal to the PDAs 73 of the measurement engineer A and the measurement assistants B and C. When the measuring apparatus 1 receives the measured point data, the measuring apparatus 1 stores three-dimensional coordinate data of the measured point in the memory section 9 with the construction name, the measurement worker name, the measurement time, and the identification data of the light-receiving apparatus 7. As a result, the PDAs 73 of the measurement engineer A and the measurement assistants B and C can acquire the measured point data from the measuring apparatus 1 at any time.

The measuring apparatus 1 sends three-dimensional coordinate data of the measured point of the measurement assistants B and C to the PDA 73 of the measurement engineer A (STEP 29). Moreover, the light-receiving apparatus 7 can directly send the measured point data of the measurement assistants B and C to the PDA 73 of the measurement engineer A without the measuring apparatus 1.

In the PDA 73 of the measurement engineer A, three-dimensional coordinate data of measured points of the measurement engineer A and three-dimensional coordinate data of measured points of the measurement assistants B and C are synthesized in the same three-dimensional space and are displayed (STEP 30). In this case, measured points, positional coordinates of measured points, names of measurement workers, etc., are displayed. As a result, the measurement engineer A can understand the progress status of the work.

When the measurement of one measured point is completed, the measurement engineer A carries out guidance of the next measured point for the measurement assistants B and C. Moreover, every time the measurement continues, the PDA 73 of the measurement engineer A can display the tracks of measured points. The tracks are graphs that connect the measured points of the measurement engineer A and the measurement assistants B and C by a straight line in each light-receiving apparatus 7. In addition, the PDAs 73 of the measurement assistants B and C can display the tracks of their own measured point.

Figure 16:
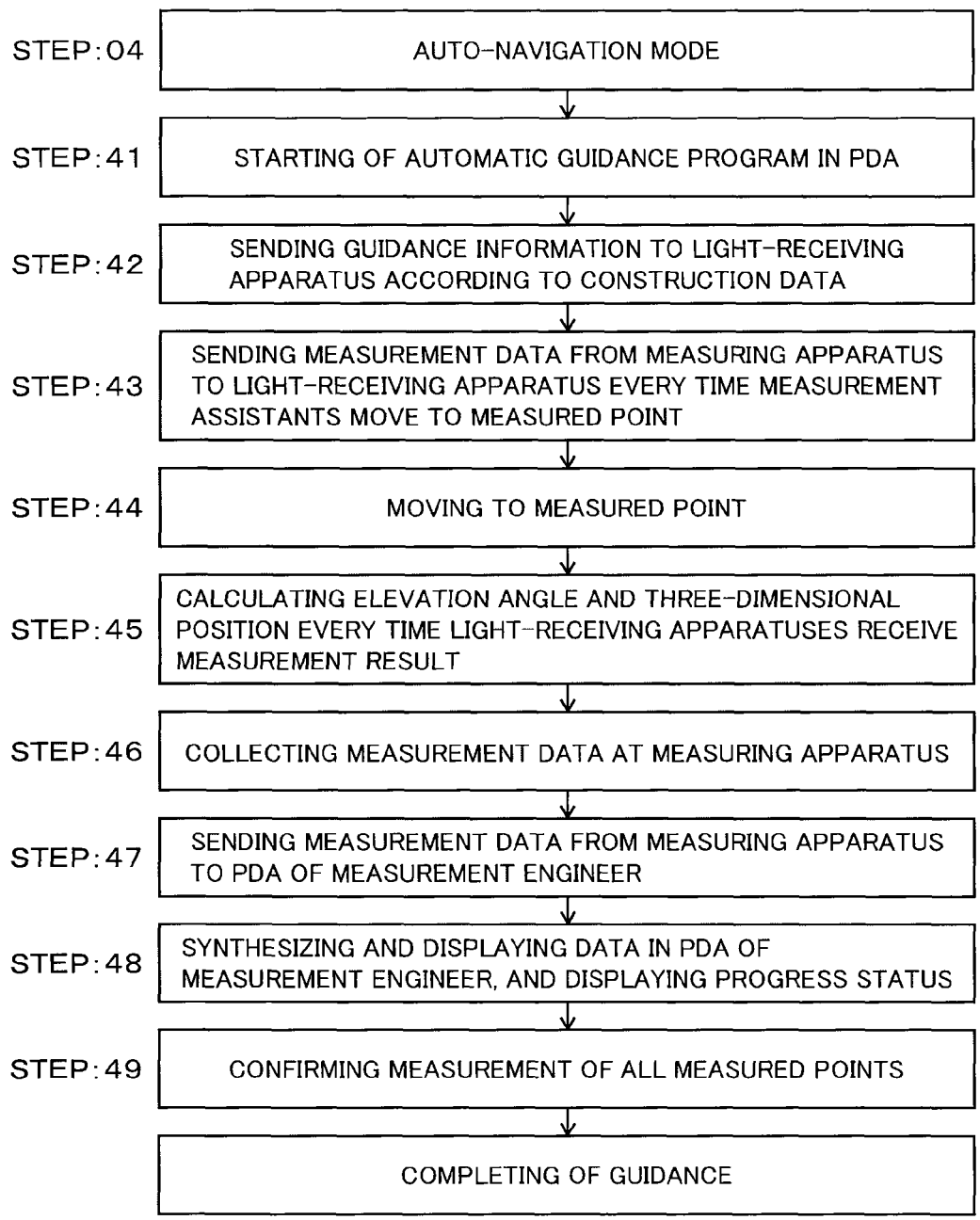
FIG. 16 is a flowchart in a case in which an auto-navigation mode was selected.

Next, the case in which the auto-navigation mode is selected is described hereinafter with reference to FIG. 16.

When the measurement engineer A and the measurement assistants B and C select the auto-navigation mode by the PDAs 73 (STEP 04), the construction data stored in the main memory section 112 of the PDAs 73 is read out, the automatic guidance program starts and advances (STEP 41). Moreover, the measuring apparatus 1 begins to measure.

When the automatic guidance program advances, the guidance information is sent to the light-receiving apparatus 7 of the measurement engineer A and the measurement assistants B and C according to the construction data (STEP 42).

While guiding, the position of the light-receiving apparatus 7 is continuously measured by the measuring apparatus 1. The measurement result is sent to the light-receiving apparatus 7 in real time (STEP 43). The light-receiving apparatus 7 compares the measurement result with the guidance information and calculates a guidance direction.

The arrow showing the guidance direction is displayed in the PDAs 73 of the measurement engineer A and the measurement assistants B and C according to the calculation of the guidance direction. The measurement assistants B and C move in the arrow direction (STEP 44). When the position of the light-receiving apparatus 7 is in a range of the tolerable quantity (matching), the measurement assistants B and C are notified that they have completed the guidance. Moreover, the arrow can turn on and off, and the turning interval can be shortened as the measured point is approached.

The one guidance completion signal is sent from the light-receiving apparatus 7 to the measuring apparatus 1. The measurement of the distance and the horizontal angle of the light-receiving apparatus 7 are carried out. The measurement result of the distance and the angle is sent from the measuring apparatus 1 to the light-receiving apparatus 7. The light-receiving apparatus 7 receives the measurement result of the distance and the angle, and calculates the elevation angle to the measuring apparatus 1 by detecting the standard-face-forming laser beam 5, and calculates the height position of the light-receiving apparatus 7 according to the distance data and the elevation angle. As a result, three-dimensional position data is calculated based on the angle data, the distance data, and the height position (STEP 45).

When the calculation of the light-receiving apparatus 7 is completed, the measured point data of the measurement engineer A and the measurement assistants B and C is sent to the measuring apparatus 1 and is collected (STEP 46). In this case, the light-receiving apparatus 7 sends a measurement completion signal to the PDAs 73 of the measurement engineer A and the measurement assistants B and C. When the measuring apparatus 1 receives the measured point data, the measuring apparatus 1 stores three-dimensional coordinate data of the measured point in the memory section 9 with the construction name, the measurement worker name, the measurement time, and the identification data of the light-receiving apparatus 7. As a result, the PDAs 73 of the measurement engineer A and the measurement assistants B and C can acquire the measured point data from the measuring apparatus 1 at any time.

The measuring apparatus 1 sends three-dimensional coordinate data of the measured point of the measurement assistants B and C to the PDA 73 of the measurement engineer A (STEP 47). Moreover, the light-receiving apparatus 7 can directly send the measured point data of the measurement assistants B and C to the PDA 73 of the measurement engineer A without the measuring apparatus 1.

In the PDA 73 of the measurement engineer A, three-dimensional coordinate data of measured points of the measurement engineer A and three-dimensional coordinate data of measured points of the measurement assistants B and C are synthesized in the same three-dimensional space and are displayed (STEP 48). In this case, measured points, positional coordinates of measured points, names of measurement workers, etc., are displayed. As a result, the measurement engineer A can understand the progress status of the work.

Moreover, the PDAs 73 of the measurement engineer A and the measurement assistants B and C check the progress status of the measurement according to the construction data and displays the progress status (STEP 48). The progress status is displayed by turning on the measured point in which the measurement is completed, and by turning on and off the measured point that should be guided. Moreover, the PDA 73 displays the number of measured points in which the measurement is completed and the number of all measured points. Then, the PDA 73 sends the guidance information of the next measured point to the light-receiving apparatus 7, and continues the guidance work.

Moreover, when the measurement of all measured points is completed as a result of the check on the progress status, the automatic guidance program finishes and all guidance is completed (STEP 49).

Figure 17:
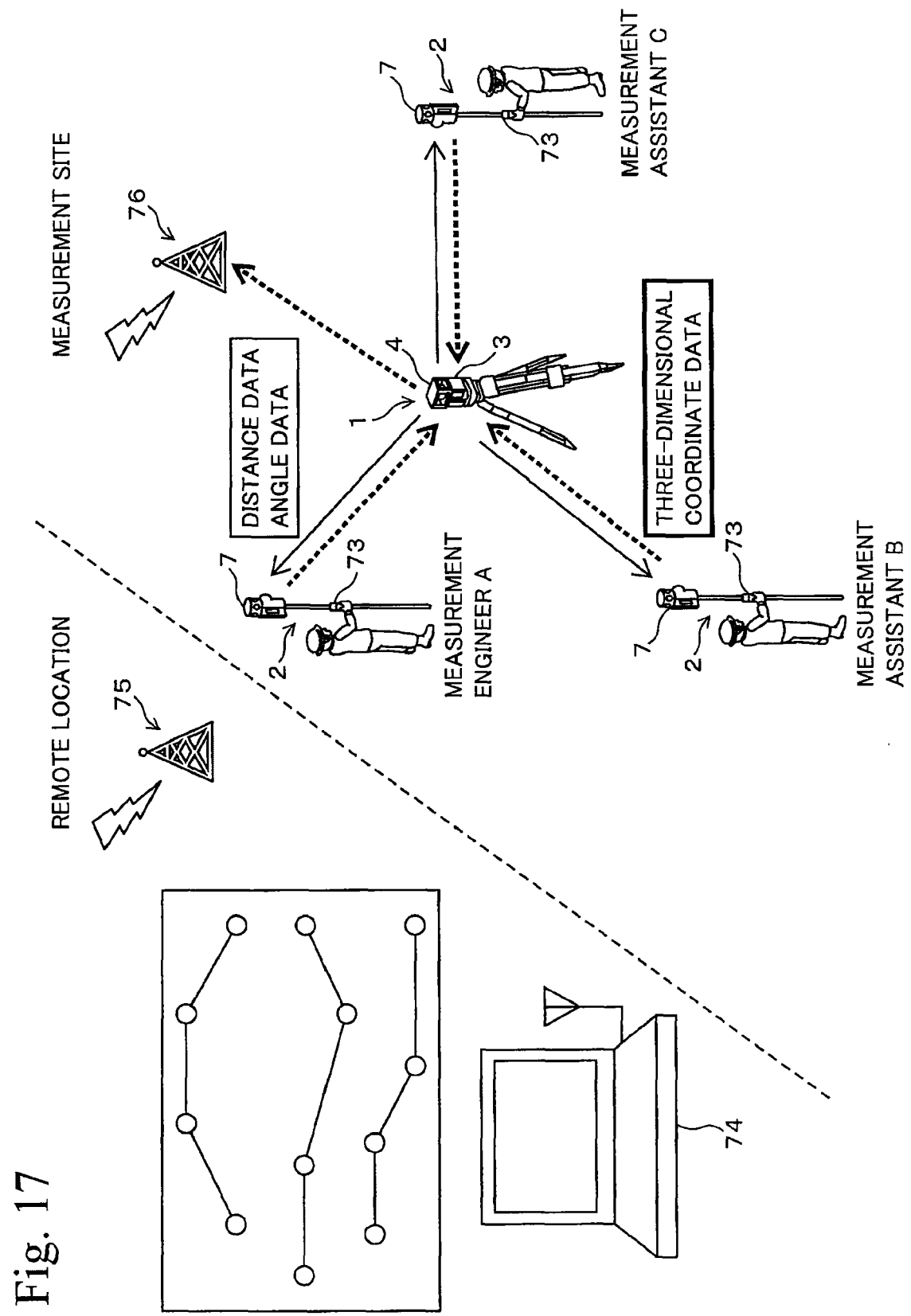
FIG. 17 is a diagram showing a data flow of a guidance control from a remote location, or a data flow of a collection of measurement data at a remote location.
Figure 18:
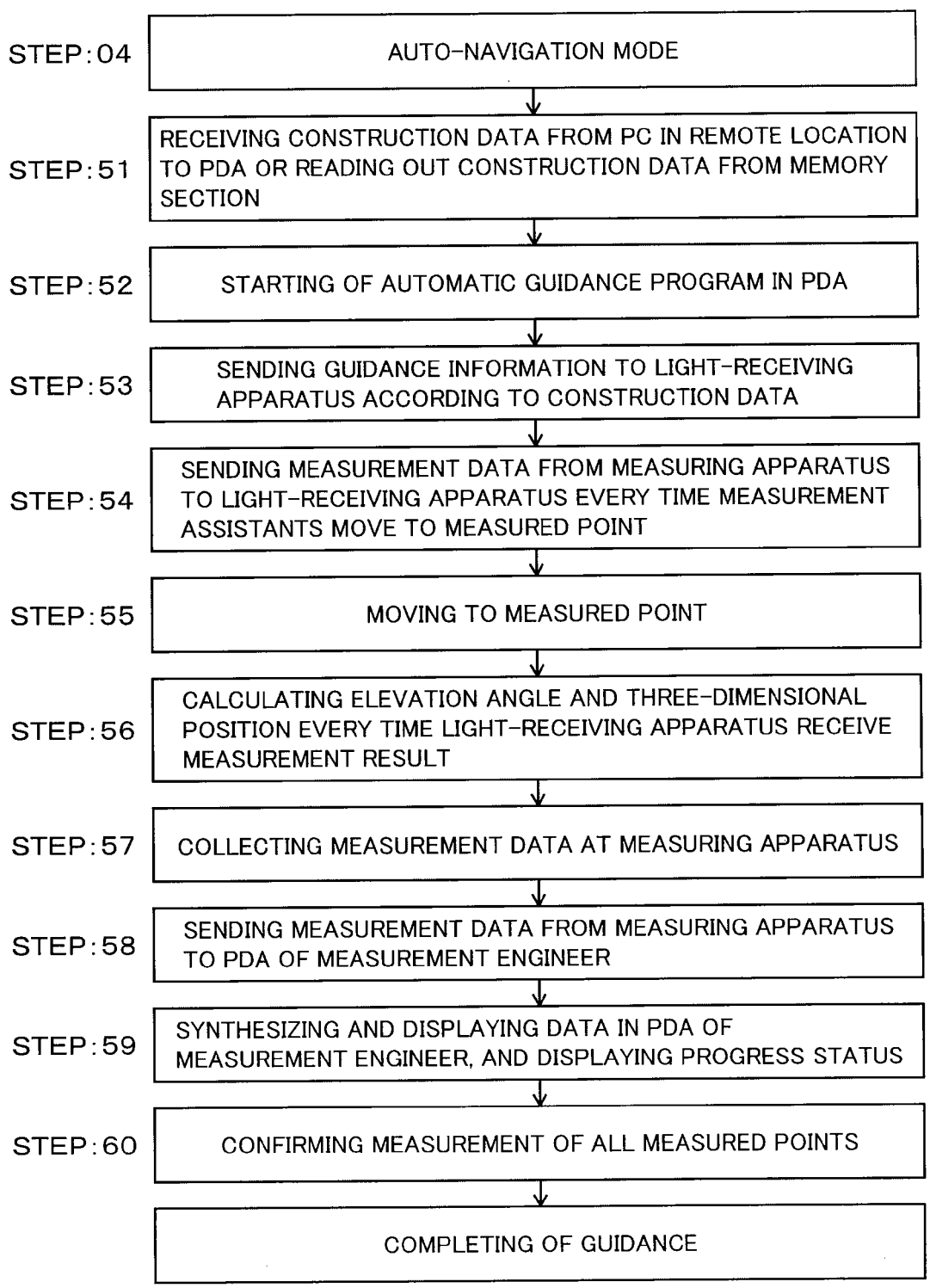
FIG. 18 is a flowchart of a guidance control from a remote location, or of a collection of measurement data at a remote location.

Next, a guidance from a control apparatus at a remote location, and a collection of the measurement data by the control apparatus at a remote location are described based on an example of the auto-navigation mode with reference to FIG. 17. The collecting method is the same as the self-mode or the navigation mode.

When the measurement engineer A and the measurement assistants B and C select the auto-navigation mode in the PDAs 73 (STEP 04), the PDAs 73 read out the construction data received from a PC 74 which is the control apparatus at a remote location, or read out the construction data stored in main memory section 112 of the PDAs 73 (STEP 51). The PDA 73 receives the construction data from the PC 74 at a remote location via a base station 75 and a base station 76. As a form of a wireless communication, for example, the PDC (personal digital cellular) method and the CDMA (code division multiple access) method used for cell phones can be used.

Moreover, the PDA 73 reads out the automatic guidance program, and the automatic guidance program starts, and advances (STEP 52). Moreover, the measuring apparatus 1 begins to measure.

When the automatic guidance program advances, the guidance information is sent to the light-receiving apparatus 7 of the measurement assistants B and C according to the construction data (STEP 53).

While guiding, the position of the light-receiving apparatus 7 is continuously measured by the measuring apparatus 1. The measurement result is sent to the light-receiving apparatus 7 in real time (STEP 54). The light-receiving apparatus 7 compares the measurement result with the guidance information, and calculates a guidance direction.

The arrow showing the guidance direction is displayed in the PDAs 73 of the measurement engineer A and the measurement assistants B and C according to the calculation of the guidance direction. The measurement assistants B and C move in the arrow direction (STEP 55). When the position of the light-receiving apparatus 7 is in a range of the tolerable quantity, the measurement assistants B and C are notified that they have completed the guidance. Moreover, the arrow can turn on and off, and the turning interval can be shortened as the measured point is approached.

The one guidance completion signal is sent from the light-receiving apparatus 7 to the measuring apparatus 1. The measurement of the distance and the horizontal angle of the light-receiving apparatus 7 are carried out. The measurement result of the distance and the angle is sent from the measuring apparatus 1 to the light-receiving apparatus 7. The light-receiving apparatus 7 receives the measurement result of the distance and the angle, and calculates the elevation angle to the measuring apparatus 1 by detecting the standard-face-forming laser beam 5, and calculates the height position of the light-receiving apparatus 7 according to the distance data and the elevation angle. As a result, three-dimensional position data is calculated based on the angle data, the distance data, and the height position (STEP 56).

When the calculation of the light-receiving apparatus 7 is completed, three-dimensional coordinate data of the measured point of the measurement engineer A and the measurement assistants B and C is sent to the measuring apparatus 1 and is collected (STEP 57). In this case, the light-receiving apparatus 7 sends a measurement completion signal to the PDAs 73 of the measurement engineer A and the measurement assistants B and C. When the measuring apparatus 1 receives three-dimensional coordinate data of the measured point, the measuring apparatus 1 stores three-dimensional coordinate data of the measured point in the memory section 9 with the construction name, the measurement worker name, the measurement time, and the identification data of the light-receiving apparatus 7. As a result, the PDAs 73 of the measurement engineer A and the measurement assistants B and C can acquire three-dimensional coordinate data of the measured point from the measuring apparatus 1 at any time.

The measuring apparatus 1 sends three-dimensional coordinate data of the measured point of the measurement assistants B and C to at least one of the PDA 73 of the measurement engineer A and the PC 74 at a remote location (STEP 58). In the at least one of PDA 73 of the measurement engineer A and the PC 74 at a remote location, as shown in FIG. 17, three-dimensional coordinate data of measured points of the measurement engineer A and three-dimensional coordinate data of measured points of the measurement assistants B and C are synthesized in the same three-dimensional space, and displayed (STEP 59). In this case, measured points, positional coordinates of measured points, names of measurement workers, etc., are displayed. As a result, the measurement engineer A or a remote worker can understand the progress status of the work and the measurement result.

Moreover, the PDAs 73 of the measurement engineer A and the measurement assistants B and C check the progress status of the measurement according to the construction data and display the progress status (STEP 59). The progress status is displayed by turning on the measured point in which the measurement is completed, and by turning on and off the measured point for which guidance should be given. Moreover, the PDA 73 displays the number of measured points in which the measurement is completed and the number of all measured points. Then, the PDA 73 sends the guidance information of the next measured point to the light-receiving apparatus 7, and continues the guidance work.

Moreover, when the measurement of all measured points is completed as a result of the check on the progress status, the automatic guidance program finishes and all guidance is completed (STEP 60).

INDUSTRIAL APPLICABILITY

The present invention can be used as a measuring system that measures positional information of a plurality of measured points at the same time.

What is claimed is:
1. A measuring system comprising:
a measuring apparatus provided at an already-known point;
a plurality of light-receiving apparatuses provided at measured points; and
a main calculating apparatus for instructing the measuring apparatus and the light-receiving apparatus;
the measuring apparatus comprising:
a laser-beam-emitting section that rotates and emits both a standard-face-forming laser beam composed of two or more fan-shaped laser beams, of which at least one beam is inclined, and a distance-measuring light;
an emission-direction detecting section for detecting the emission direction of the laser-beam-emitting section;
a distance measuring section measuring a distance between the measuring apparatus and the light-receiving apparatus by receiving the distance-measuring light reflected by the light-receiving apparatus; and
a wireless communication section for communicating measurement data with the light-receiving apparatus or with the main calculating apparatus, wherein the measurement data includes an angle detected by the emission-direction detecting section and a distance measured by the distance-measuring section;
the light-receiving apparatuses each comprising:
a reflector for reflecting the distance-measuring light in a direction of the measuring apparatus;

a light-receiving section for receiving the standard-face-forming laser beam;

a light-receiving side control arithmetic section for calculating an elevation angle to the measuring apparatus by light signals of the standard-face-forming laser beam which are received by the light-receiving section, and for calculating a height position by the elevation angle and the distance between the measuring apparatus and the light-receiving apparatus; and a light-receiving side wireless communication section for communicating the measurement data of the measured point with the measuring apparatus or with the main calculating section;

the main calculating sections each comprising:

a main wireless communication section for communicating with the measuring apparatus or with the light-receiving apparatus; and a main memory section for collecting and storing the measurement data that is measured by the measuring apparatus and by the plurality of light-receiving apparatuses.

2. The measuring system according to claim 1, wherein at least one of the measuring apparatus, the light-receiving apparatus, and the main calculating apparatus collects the measurement data at a control apparatus at a remote location.

3. The measuring system according to claim 1, wherein the main calculating apparatus or the control apparatus at a remote location further comprises a display section displaying the measurement data that was collected.

4. The measuring system according to claim 1, wherein the display section of the main calculating apparatus or of the control apparatus at a remote location displays tracks of measured points which were measured by each light-receiving apparatus.

5. The measuring system according to claim 1, wherein the plurality of light-receiving apparatuses collect the measurement data in the measuring apparatus.

6. The measuring system according to claim 1, wherein the measuring system can select any one of a first mode in which the main calculating apparatus sends a command signal for having the measurement started to the measuring apparatus via the main wireless communication section, and sends positional information of the measured point to the light-receiving apparatus via the main wireless communication section, and the light-receiving apparatus receives, in real time, the measurement data including both an angle and a distance sent from the measuring apparatus, and when the received measurement data is corresponding to the positional information of the measured point, the light-receiving apparatus calculates the elevation angle and determines the height position, and the main calculating apparatus or the measuring apparatus collects three-dimensional position data of the measured point;

a second mode in which the main calculating apparatus sends a command signal for having the measurement started to the measuring apparatus via the main wireless communication section, and sends positional information of the measured point to the light-receiving apparatus via the main wireless communication section, and a guidance direction is displayed in a light-receiving side display section of the light-receiving apparatus according to a difference between positional information of the measured point and measurement data of the light-receiving apparatus, and when the positional information of the measured point is corresponding to measurement data of the light-receiving apparatus, the light-receiving apparatus calculates the elevation angle and determines the height position, and the main calculating apparatus or the measuring apparatus collects three-dimensional position data of the measured point;

a third mode in which the main memory stores construction data, the main calculating apparatus sends guidance information to the light-receiving apparatus according to positional information of the measured point obtained from the construction data and an angle and a distance measured by the measuring apparatus, and the light-receiving side display section displays the guidance direction, and when the positional information of the measured point is corresponding to measurement data of the light-receiving apparatus, the light-receiving apparatus calculates the elevation angle and determines the height position, and the main calculating apparatus or the measuring apparatus collects three-dimensional position data of the measured point.

* * * * *